(12) United States Patent
Kato et al.

(10) Patent No.: US 7,310,812 B2
(45) Date of Patent: Dec. 18, 2007

(54) SERVICE EXECUTING METHOD AND SERVICE PROVIDING SYSTEM

(75) Inventors: Hiromitsu Kato, Machida (JP); Shigetoshi Sameshima, Machida (JP); Katsumi Kawano, Kawasaki (JP); Takeshi Miyao, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 725 days.

(21) Appl. No.: 10/717,346

(22) Filed: Nov. 18, 2003

(65) Prior Publication Data

US 2004/0111629 A1 Jun. 10, 2004

(30) Foreign Application Priority Data

Nov. 19, 2002 (JP) ............................. 2002-335423

(51) Int. Cl.
G06F 7/04 (2006.01)
G06F 17/30 (2006.01)
G06K 9/00 (2006.01)
H04L 9/32 (2006.01)
H04L 9/00 (2006.01)
H03M 1/68 (2006.01)
H04K 1/00 (2006.01)

(52) U.S. Cl. .............................. 726/2; 726/26; 726/27; 726/28; 726/29; 726/30; 713/165; 713/167; 713/182; 713/189

(58) Field of Classification Search ..................... None
See application file for complete search history.

(56) References Cited

U.S. PATENT DOCUMENTS

2003/0163567 A1* 8/2003 McMorris et al. .......... 709/225
2004/0043758 A1* 3/2004 Sorvari et al. ........... 455/414.1

FOREIGN PATENT DOCUMENTS

JP 2002-157223 5/2002

* cited by examiner

*Primary Examiner*—Benjamin E. Lanier
(74) *Attorney, Agent, or Firm*—Townsend and Townsend and Crew LLP (57) ABSTRACT

A system allows a user to select a service on a device and request a service executing function of a server to carry out the service. An authentication function authenticates the user and searches the functions of devices required in the requested service within the authority given to the user. The function acquires and registers the right to use in a device-configuration managing function through a right-to-use managing function. An adaptor delivering function delivers specifications for setting connections between functions required for execution of the service and a group encryption key generated by a key-generating function to devices. Device coordinating functions set device-embedded functions based on the received specifications. The functions conduct cipher communication with other devices using the key and carry out the service.

14 Claims, 12 Drawing Sheets

701 Node information

| Node ID | Function type | Function selection condition | Node configuration information |
|---|---|---|---|
| 1 | Numerical input | User's selection | |
| 2 | Contents connecting program | | Download to Node 4 |
| 3 | Audio input | Both \|Px-Pu\|<a and output >b | |
| 4 | Visual output | Min\|Px-Pu\| | |

705 Connection information

| Link ID | Origin node ID | Destination node ID | Link configuration information |
|---|---|---|---|
| 1 | 1 | 2 | value -> channel |
| 2 | 2 | 3 | audio_stream -> input |
| 3 | 2 | 4 | visual_stream -> input |

FIG.8

| Device name | Address | Position | Right to use | Serial number | Function type | Attribute |
|---|---|---|---|---|---|---|
| Microphone | 1.2.3.4 | (x1,y1) | | 1 | Audio input | — |
| Display | 1.2.3.5 | (x2,y2) | | 2 | Visual output | Resolution: 640×480 |
| Speaker | 1.2.3.6 | (x3,y3) | | 3 | Audio output | Output=50W |
| Portable terminal | 1.2.3.7 | (x4,y4) | User_1 | 4 | Numerical input | — |
| | | | | 5 | Visual output | Resolution: 120×160 |
| | | | | 6 | Audio output | Output=1W |

| Service | User | Service ID | Function type | Serial number | Candidate | Encryption key |
|---|---|---|---|---|---|---|
| Movie distribution | User_1 | 00023 | Numerical input | 4 | — | 012345 |
| | | | Voice output | 3 | 6 | |
| | | | Image output | 2 | 5 | |
| | | | | | | |

SERVICE EXECUTING METHOD AND SERVICE PROVIDING SYSTEM

CROSS-REFERENCE TO RELATED APPLICATION(S)

This application claims priority from Japanese patent application, No. 2002-335423, filed on Nov. 19, 2002, the entire content of which is incorporated herein by reference.

BACKGROUND OF THE INVENTION

The present invention relates to a service executing method and a service providing system wherein devices in a group carry out services in coordination with one another, and in particular to a secure service executing method and service providing system in a ubiquitous information system wherein devices coordinate directly with one another.

In information services employing Internet technology, users can enjoy services using standard software. A plurality of devices can be made to coordinate with one another with comparative ease even if the devices belong to different systems. With recent development of radio communication technology and small computer technology, the realization of ubiquitous networks has become more likely. In these networks, an IC chip with radio communication or information processing functions is embedded in every device, including home electric appliances, and many of the devices coordinate with one another. Meanwhile, further developments in security technology are expected wherein access to information is controlled instead of allowing uncontrolled access to everything.

Various service providing systems wherein information to be sent or received is dynamically sorted out according to the users' authority and to prevent multiple reception of the same data due to erroneous operation have been proposed. One such systems is disclosed in Japanese Laid Open Patent Publication No. 2002-157223. This system has a request data creating portion which creates requests with user attributes and authenticators added thereto; a basic authenticating portion which authenticates users based on user attributes and authenticators; a policy-managing portion which specifies attributes of data allowed to be accessed; a data storing portion which takes out required data according to requests; and a data-converting portion which reconstructs data according to the data attributes specified by the policy-managing portion and provides users with the data.

In this related art, an intermediate server is placed between the user's terminal and the devices to be used. Access to the devices to be used is permitted only through the intermediate server, and security is ensured by processing within the intermediate server. However, there is a possibility that the user terminal could directly access the devices to be used in a ubiquitous information system wherein all the devices communicate directly with one another. Thus, there is a limit to the application of an access control mechanism to such a system.

BRIEF SUMMARY OF THE INVENTION

The present invention provides a service executing method and a service providing system which can carry out services in safety in a ubiquitous information system wherein devices coordinate directly with one another without depending on an intermediate server. The present invention provides a service executing method wherein a plurality of devices and a server which manages the devices which are used and one or more devices provide services in coordination with one another. More specifically, according to the present invention, one of a plurality of the devices employed by a user prompts the user to select a service from a provided service menu and acquire service logic wherein the specifications for implementing the selected service are described. Based on profile information, the server selects devices having functions required for carrying out the service according to the service logic, acquires the right to use the selected functions, extracts service components involving configuration information for the functions based on the service logic, generates adaptors from the extracted service components, and delivers the generated adaptors to the devices which are to carry out the service. Then the devices which received the adaptors carry out the service according to the information in the adaptors.

Further, the present invention provides a service-providing system wherein a plurality of devices and a server which manages the devices are used and one or more devices provide services in coordination with one another. More specifically, according to the present invention, a device used by a user has a unit which prompts the user to select a service from a provided service menu and acquires a service logic wherein the specifications for implementing the selected service are described. The server has a unit which, based on profile information, selects devices having functions required for carrying out the service according to the service logic, a unit which acquires the right to use the selected functions, a unit which extracts service components involving configuration information for the functions based on the service logic, a unit which generates adaptors from the extracted service components, and a unit which delivers the generated adaptors to the devices which are to carry out the service. The devices which are to carry out the service have units which receive the adaptors delivered from the server and carry out the service according to the information in the adaptors.

As mentioned above, according to the present invention, when devices in a group provide services in coordination with one another, the services can be continuously enjoyed without constant intervention of a server or external interference. These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 15 is a flowchart illustrating the processing steps in transfer negotiation. Transfer negotiation takes place when as the result of movement or like action, a user is able to connect to more favorable functions in the area and takes over the functions from another user.

DETAILED DESCRIPTION OF THE INVENTION

Figure 1:
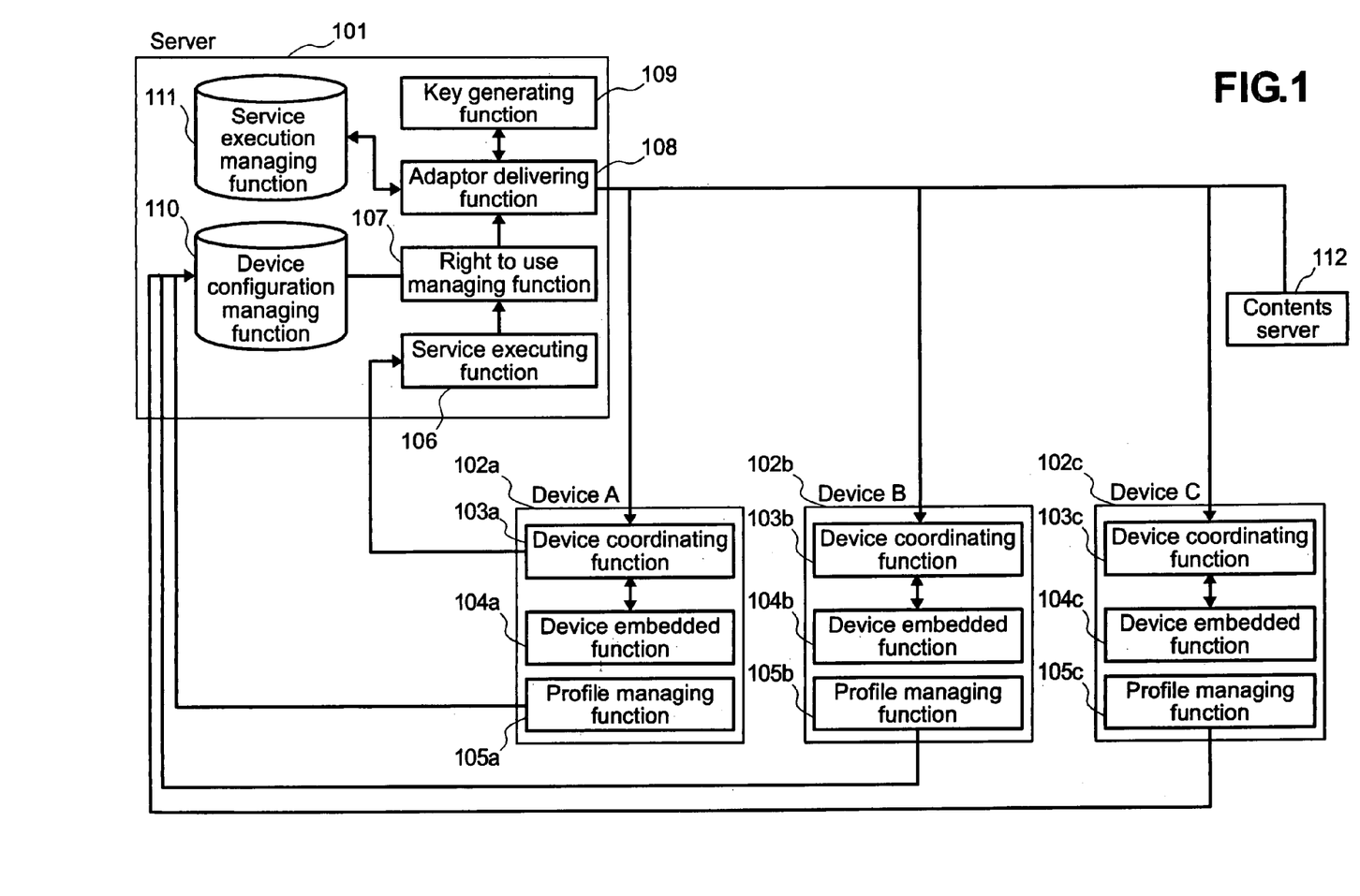
FIG. 1 is a block diagram illustrating the configuration of the functional blocks in the service providing system in an embodiment of the present invention.

Referring to the drawings, the embodiment of the service-executing method and the service-providing system of the present invention is described in detail below. FIG. 1 is a block diagram illustrating the arrangement of the functional blocks of the service-providing system in an embodiment of the present invention The embodiment of the present invention illustrated in FIG. 1 is applicable to public spaces, such as waiting rooms in stations, town halls, village offices, and the like. In the example illustrated, a system consists of a server 101, three devices 102a to 102c, and a contents server. There is no limitation on the number of devices provided at least one is present.

The individual devices 102a to 102c are provided with device-coordinating functions 103a to 103c, device embedded-functions 104a to 104c, and profile-managing functions 105a to 105c, respectively. The device coordinating-functions 103a to 103c dynamically coordinate device-embedded functions 104a to 104c, and devices A 102a to C 102c to provide services thereby.

On the assumption that a movie delivery service is provided, one embodiment of the present invention is described below. Device-embedded functions 104a to 104c control sensors and actuators belonging to devices 102a to 102c. Whatever device-embedded functions 104a to 104c are provided for the individual devices are managed at the respective profile-managing functions 105.

Server 101 is provided with service-executing function 106, right-to-use managing function 107, adaptor-delivering function 108, key-generating function 109, device-configuration managing function 110; and service-execution managing function 111. Service-executing function 106 receives service logic from a user or service provider and carries out services according to the specifications thereof Service logic expresses the specifications for functions required for carrying out service and coordination between the functions. Examples of service logic are described in detail below. Devices 102a to 102c present in the area under control of server 101 catalog the profiles of device-embedded functions 104 held in individual devices 102a to 102c into device-configuration managing function 110 in advance.

Right-to-use managing function 107 performs such operations as registration, confirmation, and deletion with respect to the right to use the functions managed by device-configuration managing function 110. Adaptor-delivering function 108 delivers specifications for function-coordination connection and group-encryption keys as adaptors to device coordinating functions 103a to 103c.

Specifications for function-coordination connections are required for some of devices 102a to 102c to coordinate with one another as a device group. The group encryption keys are generated by key-generating function 109. Service-execution managing function 111 manages, in a centralized manner, the functions currently allocated to carry out a service, for example using a group encryption key, or other security. Contents server 112 stores content, such as video and audio, which may be requested as one of the provided services. Contents server 112 provides required contents in response to requests from users.

Figure 2:
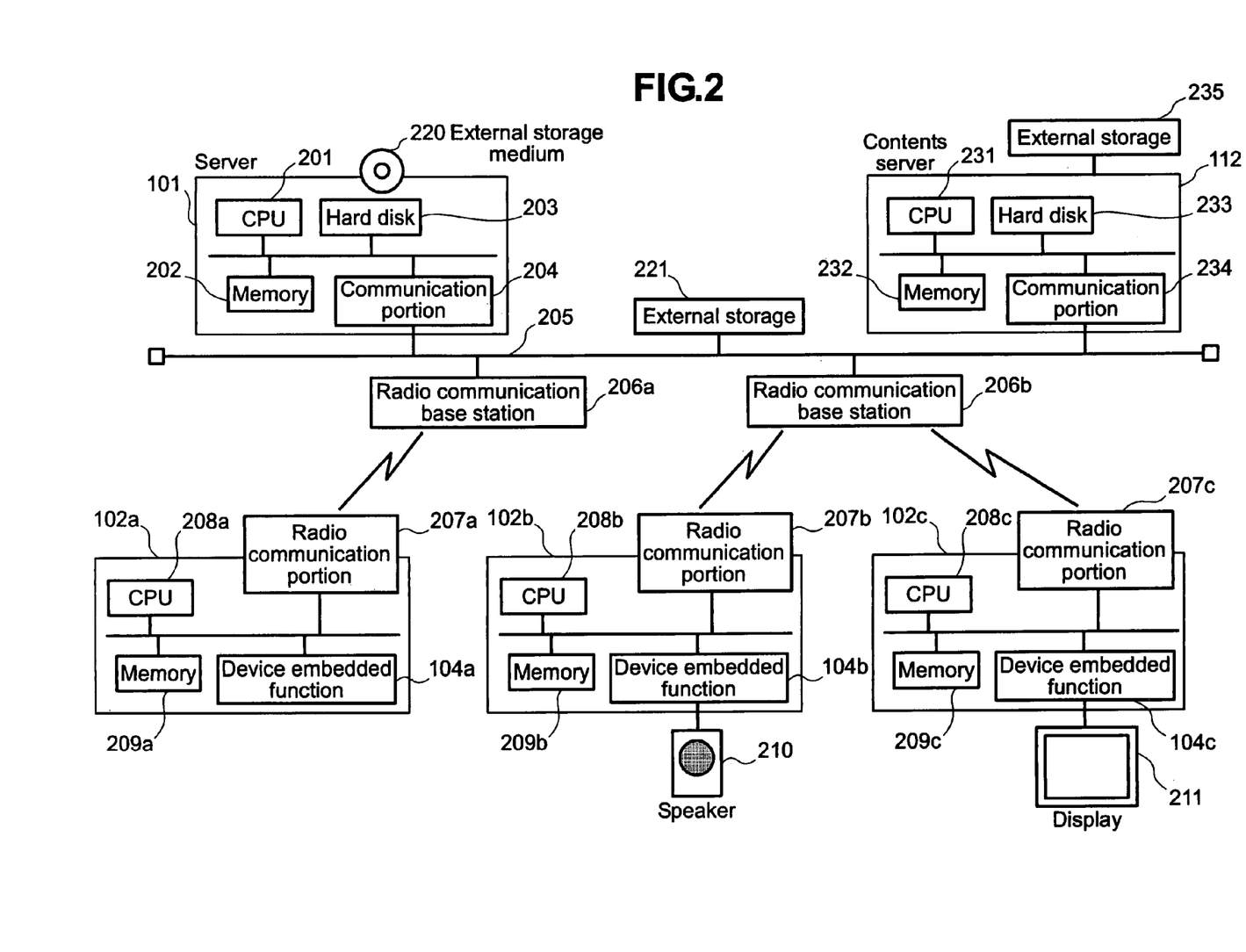
FIG. 2 is a block diagram of the hardware configuration of the service providing system in an embodiment of the present invention.

FIG. 2 is a block diagram illustrating the hardware configuration of the entire service-providing system in one embodiment of the present invention. In the system illustrated in FIG. 2, server 101 has a CPU 201 as the operation portion, a memory 202 as the primary storage portion, a hard disk 203 as the secondary storage portion, and a communication portion 204. Server 101 can communicate externally through a network 205. Hard disk 203 as the secondary storage portion stores programs required for processing. The programs are loaded memory 202 as the primary storage portion and executed by CPU 203 as the operation portion. The programs are not only locally stored in the built-in hard disk 203. The programs may be stored in an external storage medium 220, such as CD-ROM, or stored in an external storage unit 221 which is connectable through network 205.

Similarly, contents server 112 has a CPU 231, memory 232, hard disk 233, and communication portion 234. Hard disk 233 of contents server 112 holds not only programs required for processing but also contents to be provided. To store massive contents, contents server 112 may be connected with external storage 235. Moreover, required contents may be stored in external storage 221.

In addition, devices 102a to 102c have CPU 208a to 208c and memory 209a to 209c, respectively. Programs loaded to memories 209a to 209c are computed by CPUs 208a to 208c to control device-embedded functions 104a to 104c. As mentioned above, device-embedded functions 104a to 104c are functions for controlling sensors and actuators. In this example, device-embedded function 104b of device 102b is for controlling speaker 210, and device-embedded function 104c of device 102c is for controlling the display. Radio communication portions 207a to 207c communicate with the external radio communication base stations 206. Devices 102a to 102c can communicate with server 101 and contents server 112 through network 205.

Figure 3:
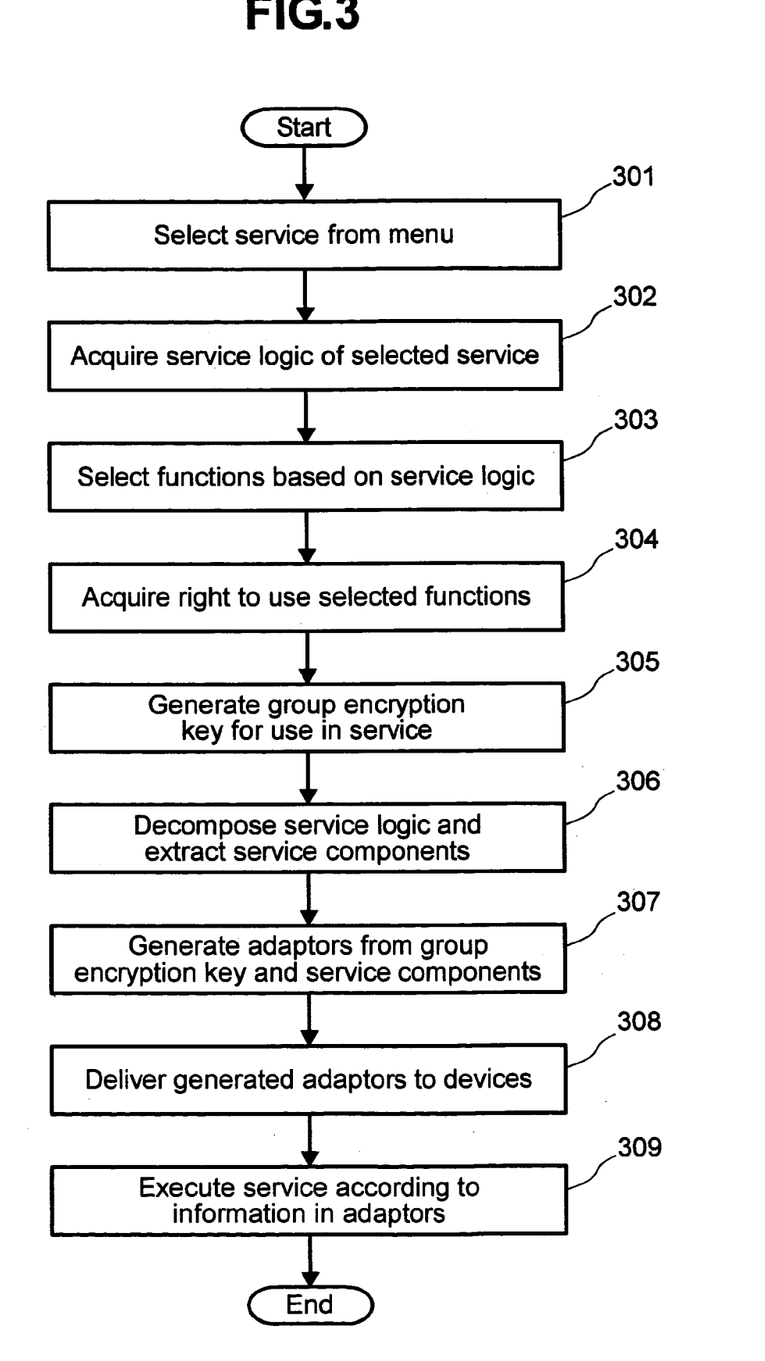
FIG. 3 is a flowchart illustrating the processing steps followed when devices carry out a service in coordination with one another.

FIG. 3 is a flowchart illustrating the processing steps followed when devices 102a to 102c carry out a service in coordination with one another. As an example, it is assumed that one of the devices, or device 102a held by a user, is a cellular-phone-type information terminal.

(1) To begin the process, the user of services selects a service the user desires from a menu displayed on the terminal. Information on the menu may be held in local memory 209a of device 102a or read out of remote external storage 221 (Step 301).

Figure 4:
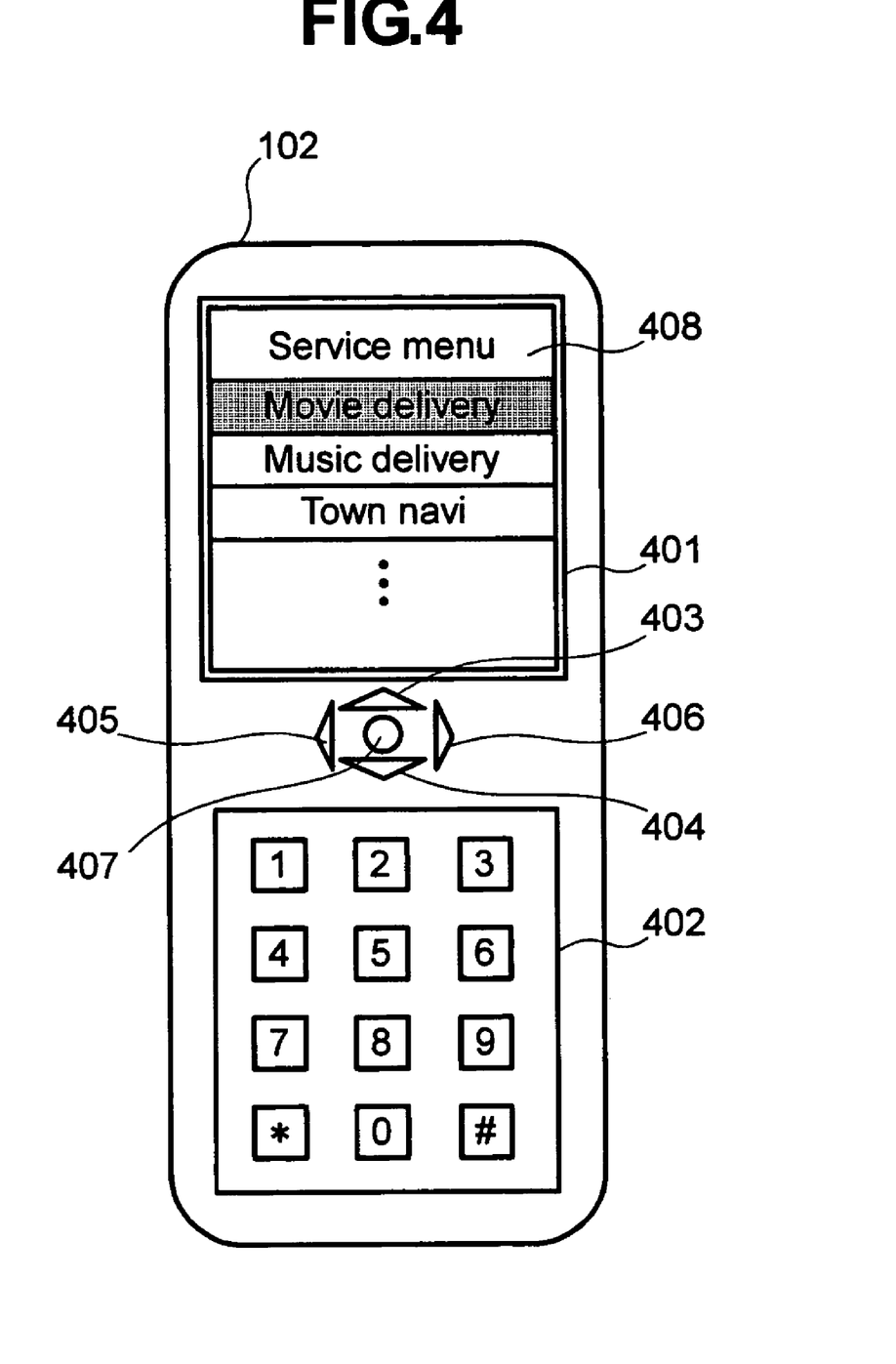
FIG. 4 illustrates an example of the display image of a menu on a cellular phone-type terminal as device 102*a*.

FIG. 4 illustrates an example of the display image of the menu on a cellular-phone-type information terminal as device 102a. It is assumed that device 102a is a cellular-phone-type information terminal. Device 102a has a display screen 401, a numeric keypad 402 for inputting numbers, an up scroll button 403, a down scroll button 404, a left scroll button 405, and a right scroll button 406 for moving the cursor on screen 401, and a select button 407. The cursor is moved up and down and left and right by pressing the appropriate scroll button 403 to 406, The selection of a menu option is determined by pressing decision button 407. A service menu 408 is displayed on screen 401. In this example, it is assumed that "movie delivery" is selected.

(2) Next, the service logic of the selected service is acquired. Service logic expresses the relation between the selected service and device-embedded functions 104*a* to 104*c* provided in individual devices 102*a* to 102*c* (Step 302) of FIG. 3.

Figure 5:
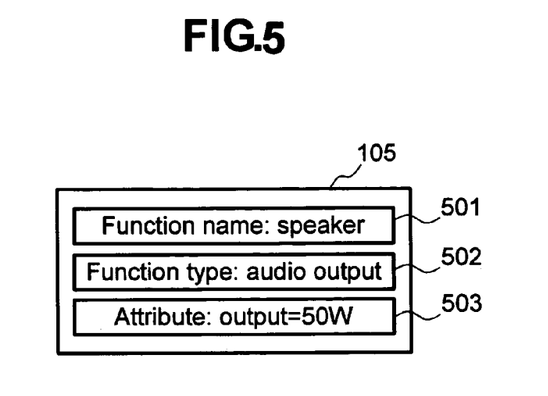
FIG. 5 illustrates an example of the profile of a device embedded function.
Figure 6:
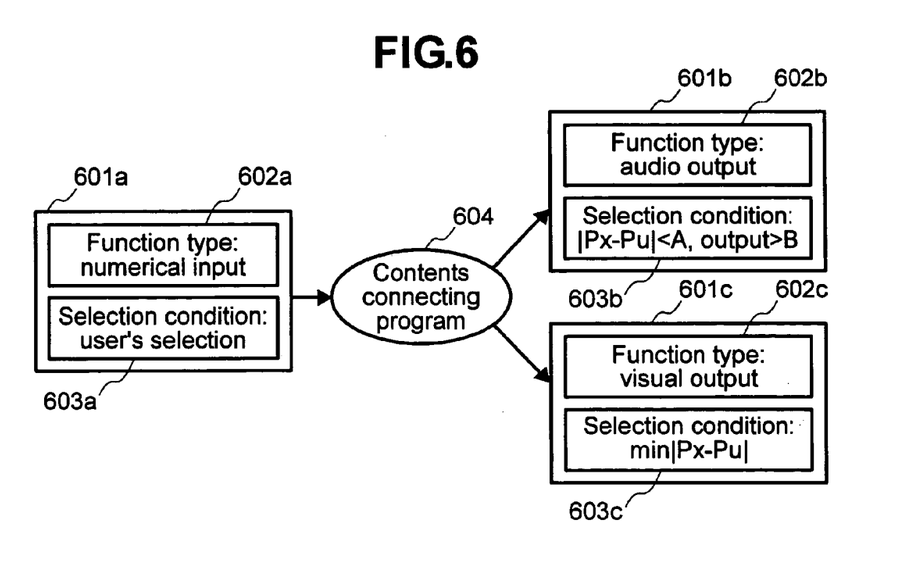
FIG. 6 illustrates an example of a service logic.
Figure 7:
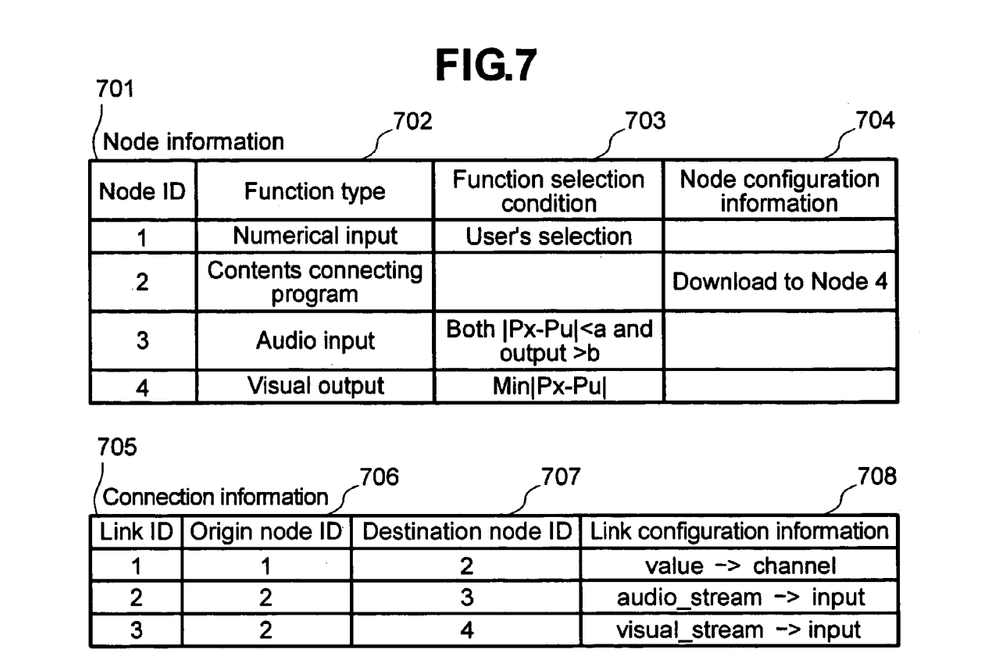
FIG. 7 illustrates an example of the service logic in FIG. 6 presented in tabular form.

FIG. 5 illustrates one example of the profile of device-embedded function 104*b*, and FIG. 6 illustrates an example of the service logic. FIG. 7 illustrates the service logic in FIG. 6 presented in tabular form. As illustrated in FIG. 5, profile-managing functions 105*a* to 105*c* store and manage function names 501, function types 502, and attributes 503. In the case of device 102*b* containing speaker 210, the function name 502 of "speaker," the function type 503 of "audio output," and the attribute 503 of "output=50 W" are cataloged.

The service logic is primarily based on function type 503. For example, the service logic of movie delivery service is expressed as illustrated in FIG. 6. That is, service logic is graphic representation of the relation between functional units 601*a* to 601*c* and programs. The functional units 601*a* to 601*c* include conditions 602*a* to 602*c* of function types to be found and selection conditions 603*a* to 603*c* for selecting relevant functions.

In the example of the service logic of FIG. 6, functional unit 601 a represents the function of the cellular-phone-type information terminal as the device 102*a* held by the user. The logic is such that input to a contents connecting program 604 is taken as the function of function type condition 602*a* "numerical input." Audio output produced by the contents connecting program 604 is outputted to the function of function type condition 602*b* "audio output" of device 102*b*. Further, visual output produced by the contents connecting program 604 is outputted to the function of function type condition 602*c* "visual output" of the device 102*c*.

The conditions for selecting these functions are as follows: function type condition 602*a* "numerical input" follows selection condition 603*a* "user's selection" to select the functions selected by the user. The selection condition 603*b* for function type condition 602*b* "audio output" is both "|Px−Pu|<A" and "output>B", where Px represents the position of the device 102*b* having the relevant function and Pu represents the position of the device 102*a* possessed by the user. There are a variety of possible methods for acquiring positional information. In a preferred embodiment, the positions of the radio communication base stations 206*a* and 206*b* accessed by devices 102*a* to 102*c* during radio communication are used. Hence, in this case, under selection condition 603*b*, a device satisfying the following condition is selected: the distance between the user device and the device having an audio output function is smaller than a predetermined distance A, and the output of the audio output function is greater than a predetermined output B. Whereas, selection condition 603*c* "min |Px−Pu|" of function type condition 602*c* "visual output" means that a device which provides the minimum distance between the user device 102*a* and device 102*c* having a visual output function is selected. Contents connecting program 604 is for connection to the contents server 112.

The above-mentioned service logic can be presented in tabular form. As illustrated in FIG. 7, in the tabular representation, service logic is expressed by two tables: a table of node information and a table of connection information. The headings in the table presenting node information include node ID 701, function type 702, selection condition 703, and node configuration information 704. Under function type 702, information on function type conditions 602*a* to 602*c* in the functional units 601*a* to 601*c* is registered. Under function selection condition 703, selection conditions 603*a* to 603*c* are registered. After program 604 constituting a node is registered as function type 702. The node to which a selected program should be downloaded when executed is specified under node configuration information 704.

Connection information for the individual nodes is presented in a separately prepared table of connection information. The headings in the table of connection information include link ID 705, origin node ID 706, destination node ID 707, and link configuration information 708. The link ID 705 is the identifiers of links connecting nodes, and the origin node ID 706 and destination node ID 707 are node IDs which are identifiers registered as serial numbers under node ID 701. Link configuration information 708, information indicating how the application interfaces of the origin node and the destination node should be connected together, is written in this column. For the link given ID "1" in the example in the figure, information indicating the following is written: an application interface "value" held by the "numeric inputting function" whose node ID is "1" is connected to an application interface "channel" held by the "contents connecting program" whose node ID is "2." Thus, numerics set by the numeric inputting function are brought into coordination with the channel of movie delivery service.

(3) Next, required functions are selected based on the above-mentioned service logic. In the embodiment of the present invention, functions are selected from device-configuration managing function 110 (Step 303).

Figure 8:
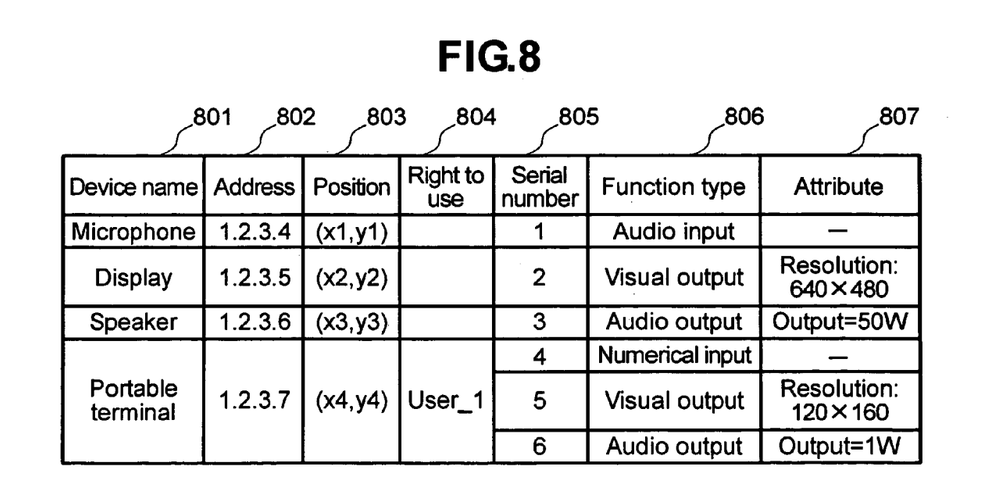
FIG. 8 illustrates an example of a device configuration management table managed by a device-configuration managing function.

FIG. 8 illustrates an example of the device configuration management table managed by device-configuration managing function 110. The device-configuration management table makes contains the following headings enumerating information that makes managing device configuration possible: device name 801, address 802, position 803, right to use 804, function serial number 805, function type 806, and attribute 807. The table is searched for required functions specified by the service logic. Under type of function "numerical input," the numeric input function of the portable terminal whose serial number is "4" is lined up as a candidate. Under type of function "audio output," the audio output function of the speaker whose serial number is "3" or the audio output function of the portable terminal whose serial number is "6" is lined up as a candidate. Under type of function "visual output," the visual output function of the display whose serial number is "2" or the visual output function of the portable terminal whose serial number is "5" is lined up as a candidate. In the processing at Step 303, the user may be authenticated so that functions will be selected within the authority given to the identified user. Thus, accesses can be controlled so that unauthorized functions cannot be used.

Figure 9:
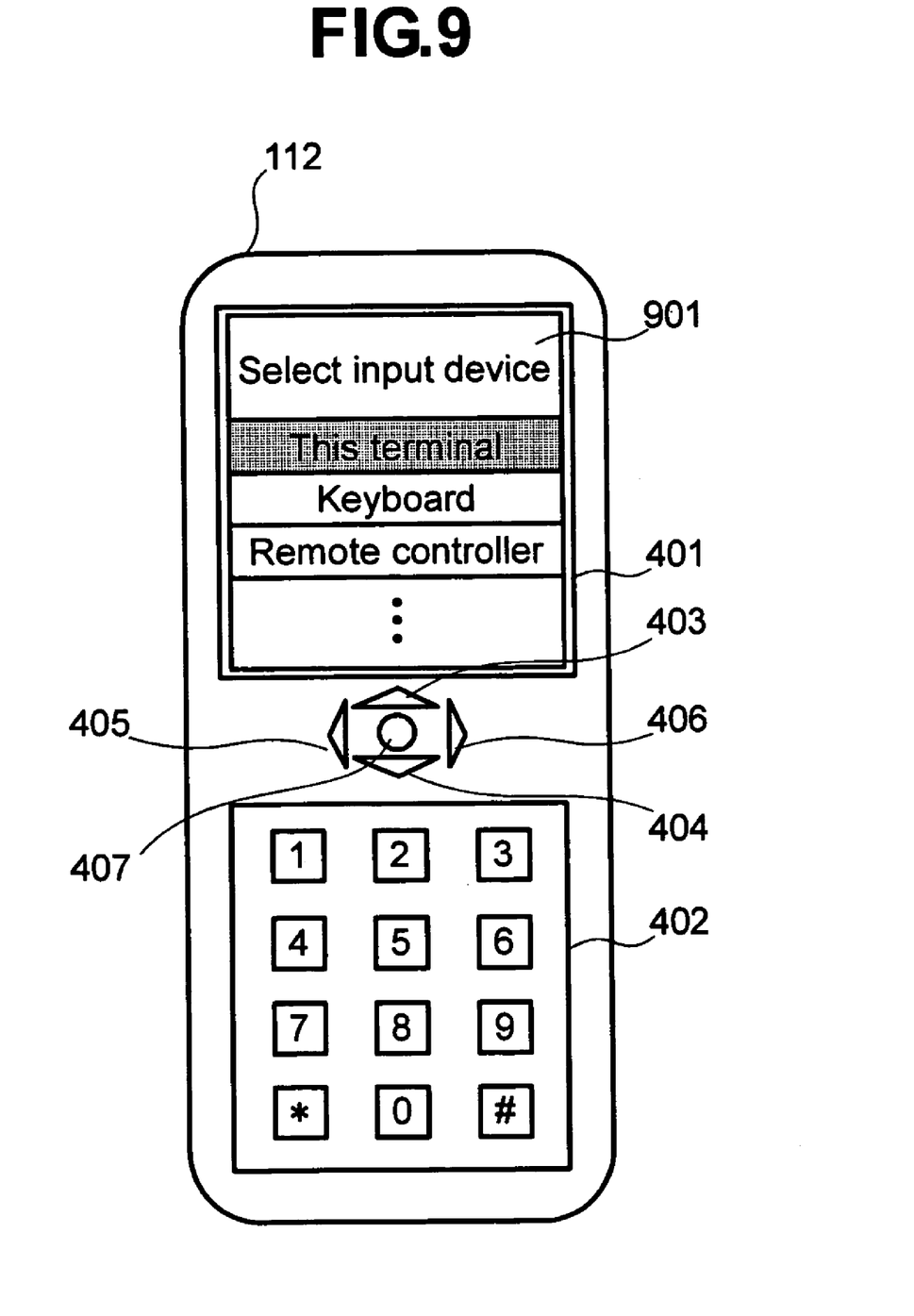
FIG. 9 illustrates an example of a display image for a user to select devices to be used on a portable terminal.

FIG. 9 illustrates an example of a display for a user to select devices to be used on the portable terminal. It is assumed that in the above-mentioned search of functions, the following are selected as functions which meet selection conditions 603*a* to 603*c*: for numeric inputting function, numeric keypad 402 of the portable terminal whose serial number is "4" is selected by the user from menu 901, illustrated in FIG. 9; for audio output function, speaker 210 whose serial number is "3" is selected; and for visual output function, display 211 whose serial number is "2" is selected.

(4) At the next processing step, the right-to-use the selected functions is acquired. This is performed as follows: it is determined whether any other user is registered for the right to use 804 with respect to the relevant functions managed by device-configuration managing function 110. If not, the right to use is acquired, and the user concerned is registered in the relevant field (Step 304).

(5) When the right to use is acquired with respect to all the functions required by the service logic at Step 304, a group encryption key for use in providing the service is generated by key-generating function 109. Thus, preparations for carrying out the service are made (Step 305).

Figure 10:
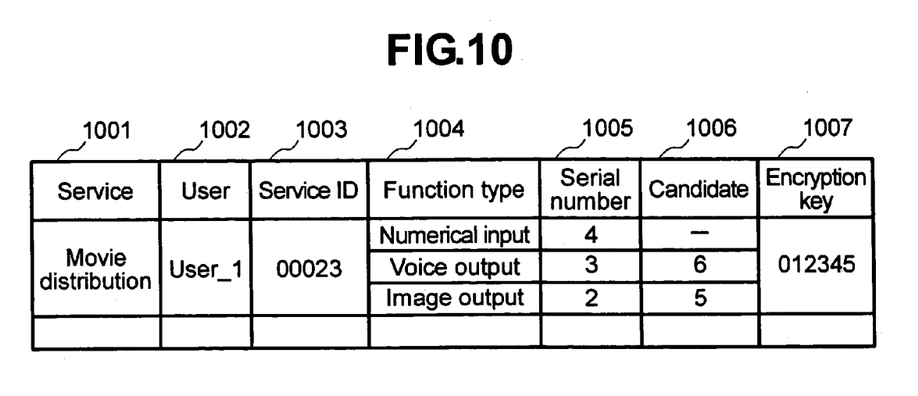
FIG. 10 is a drawing presenting information managed by a service-execution managing function in tabular form.

FIG. 10 is a drawing presenting the information managed by service-execution managing function 111 in tabular form. As illustrated in FIG. 10, service-execution managing function 111 manages the following items: service name 1001, user 1002, service ID 1003, function type 1004, serial number 1005, candidate 1006, and encryption key 1007. Group encryption keys generated are registered in the corresponding fields under encryption key 1007. In the case of the embodiment of the present invention, which has been described up to now, the following are done with respect to "movie delivery service": "User_1" is registered as the user, and "00023" is assigned as the service ID. For "numerical input" as one of the required function types, the function whose serial number is "4" managed by device-configuration managing function 110 is set. For "audio output," the serial number of "3" is set, and for "visual output," the serial number of "2" is set. With respect to alternative candidates, the function whose serial number is "6" is registered in the relevant field under candidate 1006 for audio output. Further, the function whose serial number is "5" is registered in the relevant field for visual output. Moreover, "012345" is registered under encryption key 1007.

An embodiment of the present invention is characterized in that in addition to functions which actually provide services, functions which can be alternative candidates are also managed. By managing alternative candidates, functions can be immediately changed when trouble occurs in functions in execution or when the right to use functions must be transferred.

(6) Subsequently, adaptor delivering function 108 breaks up the service logic and extracts service components. Service components are setup specifications which are delivered to devices and used for the settings required to carry out services (Step 306).

Figure 11:
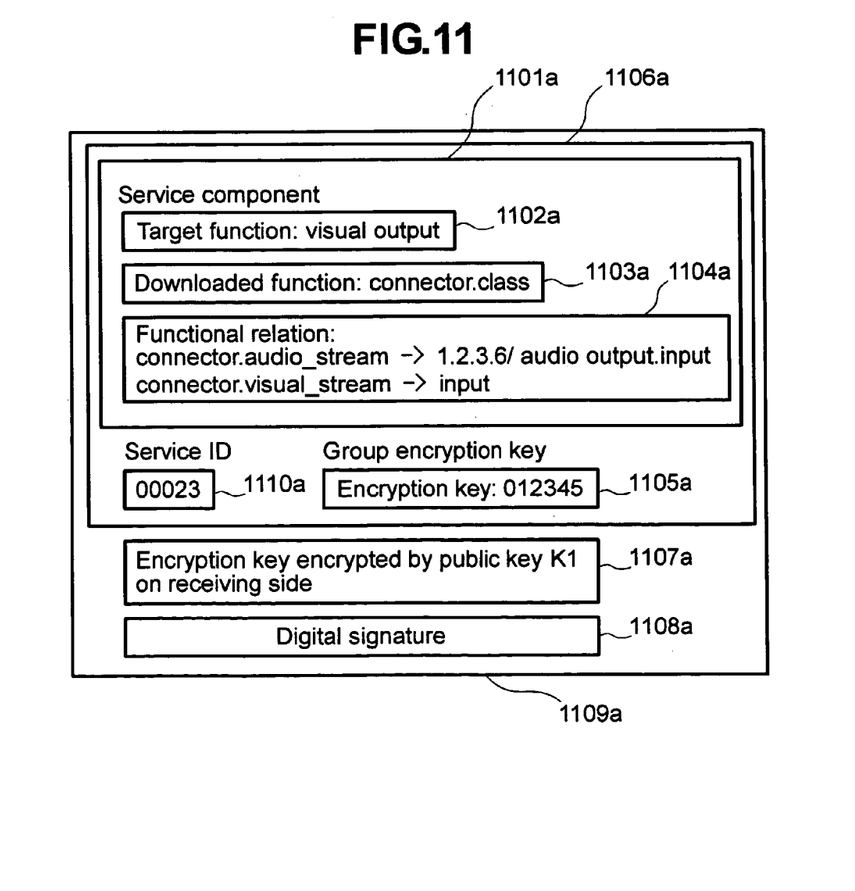
FIG. 11 illustrates an example of a message containing an adaptor delivered to a device provided with a display as a visual outputting function.
Figure 12:
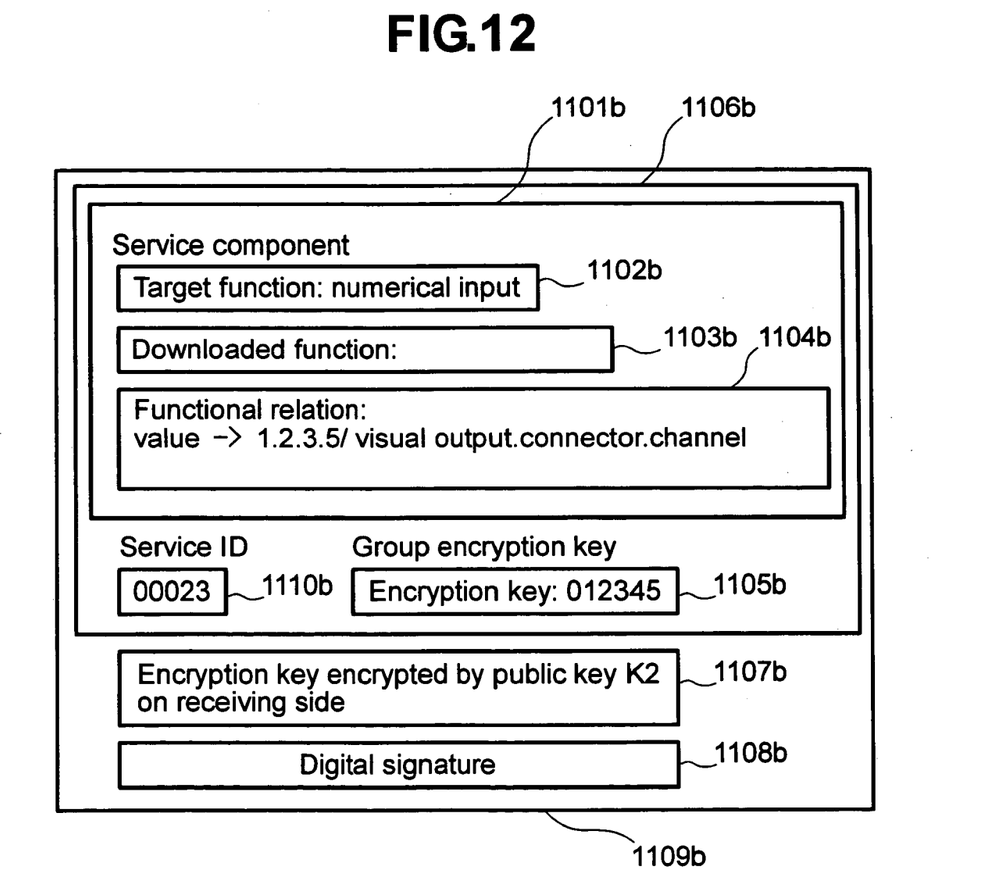
FIG. 12 illustrates an example of a message containing an adaptor delivered to a device provided with a numeric inputting function.
Figure 13:
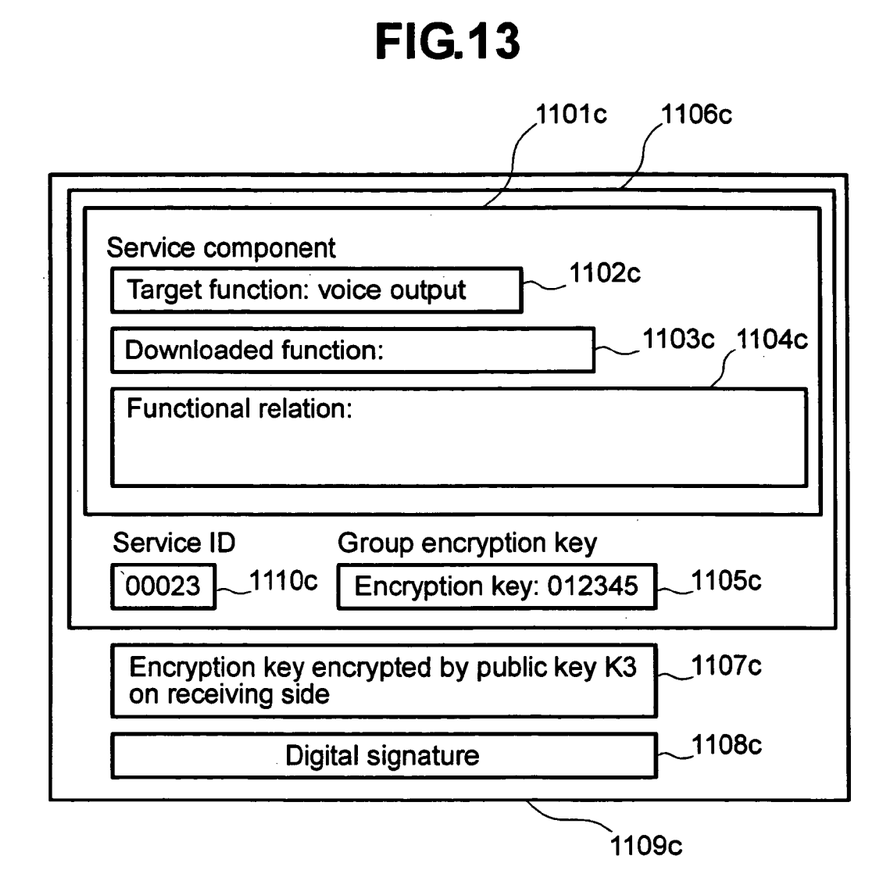
FIG. 13 illustrates an example of a message containing an adaptor delivered to a device provided with a speaker as an audio outputting function.

FIG. 11 illustrates an example of a message containing an adaptor delivered to a device provided with a display as the visual output function. FIG. 12 illustrates an example of a message containing an adaptor delivered to a device provided with a numeric input function. FIG. 13 illustrates an example of a message containing an adaptor delivered to a device provided with a speaker as the audio output function.

In service component 1101a to be delivered to device coordinating function 103c of device 102c having display 211, the following are described: a function 1102a is the target; a downloaded function 1103a is the program to be downloaded; and functional relation 1104a is information about the configuration of coordination between functions. According to the configuration information of the service logic described using FIG. 7, the contents connecting program must be downloaded to the visual output function (as node 4). Therefore, a program file name "connector.class" is registered as the downloaded function 1103a. When executed, the program file functions as a program "connector." For functional relation 1104a, an instruction to connect "audio_stream," the audio output interface of the program "connector," to the "input" interface of the audio output function provided in the device at address "1.2.3.6." is described. This instruction is written as "connector.audio_stream->1.2.3.6/audio output.input." The visual output interface "visual_stream" of the program "connector" is expressed as "connector.visual_stream->input" with the address and function type name omitted. This is because it connects to the "input" interface of the visual output function itself.

(7) An adaptor 1106a is generated based on the service component 1101a generated as mentioned above and the group encryption key 1105 generated at Step 305 (Step 307). The adaptor 1106a also contains the service ID 1110a managed by service-execution managing function 111. In the embodiment of the present invention, this adaptor 1106a is encrypted by an adaptor encryption key and further encrypted by a public key K1 on the receiving side. Thus, adaptor 1106a cannot be decrypted by devices other than a device having a private key paired with the public key K1. Unauthorized use of the adaptor 1106a is thereby prevented. Further, the digital signature 1108a of the entire data entry is generated using the private key of server 101. Thus, fraudulent delivery of adaptors by deceiving server 101 is prevented.

(8) Next, adaptor delivering function 108 delivers generated adaptor 1106a as well as the encryption key and the digital signature as one message 1109a to each corresponding device (Step 308). In the above description, an adaptor to be delivered to the device provided with the display as the visual output function is used as an example. Similarly, the message 1109b illustrated in FIG. 12 is delivered to the user's portable terminal selected as the numeric input function. Further, message 1109c illustrated in FIG. 13 is delivered to device 102b provided with a speaker 210.

(9) Finally, receiving the above-mentioned messages, the devices carry out the service according to information in adaptors 1106a to 1106c in the messages (Step 309).

Figure 14:
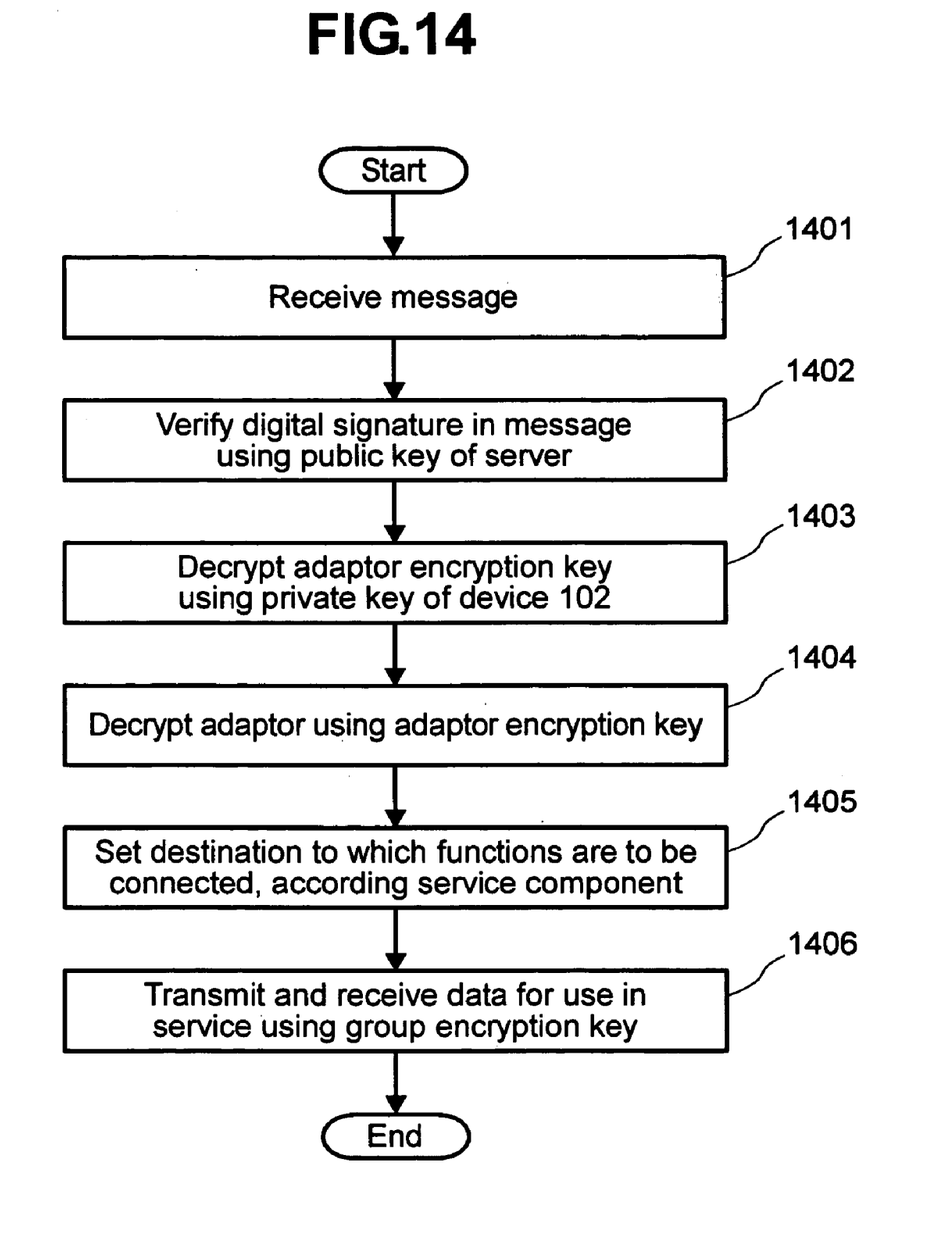
FIG. 14 is a flowchart illustrating in detail the processing steps in service execution.

FIG. 14 is a flowchart of the processing steps in the service execution at Step 309. The process steps are described below.

(1) After receiving messages 1109a to 1109c, individual devices 102a to 102c verify digital signatures 1108a to 1108c in the messages using the public key of server 101 (Steps 1401 and 1402).

(2) When the signatures are successfully verified at Step 1402, devices 102a to 102c decrypt the adaptor encryption key using their own private keys. Devices 102a to 102c decrypt adaptors 1106a to 1106c using the thus decrypted adaptor encryption key (Steps 1403 and 1404).

(3) Devices 102a to 102c set the destination to which the functions are to be connected, according to service components 1101a to 1101c in decrypted adaptors 1106a to 1106c (Step 1405).

(4) If a device uses the function of any other device, the device encrypts data used in the service using group encryption key 1105a to 1105c and performs data transmission/reception (Step 1406).

The above embodiment of the present invention is characterized in that when the devices in a group coordinate with one another, the devices encrypt data by a common group encryption key 1105a to 1105c. Thus, once a group is formed, external devices which do not share the group encryption key cannot interfere with the group, and services can be continuously maintained.

Figure 15:
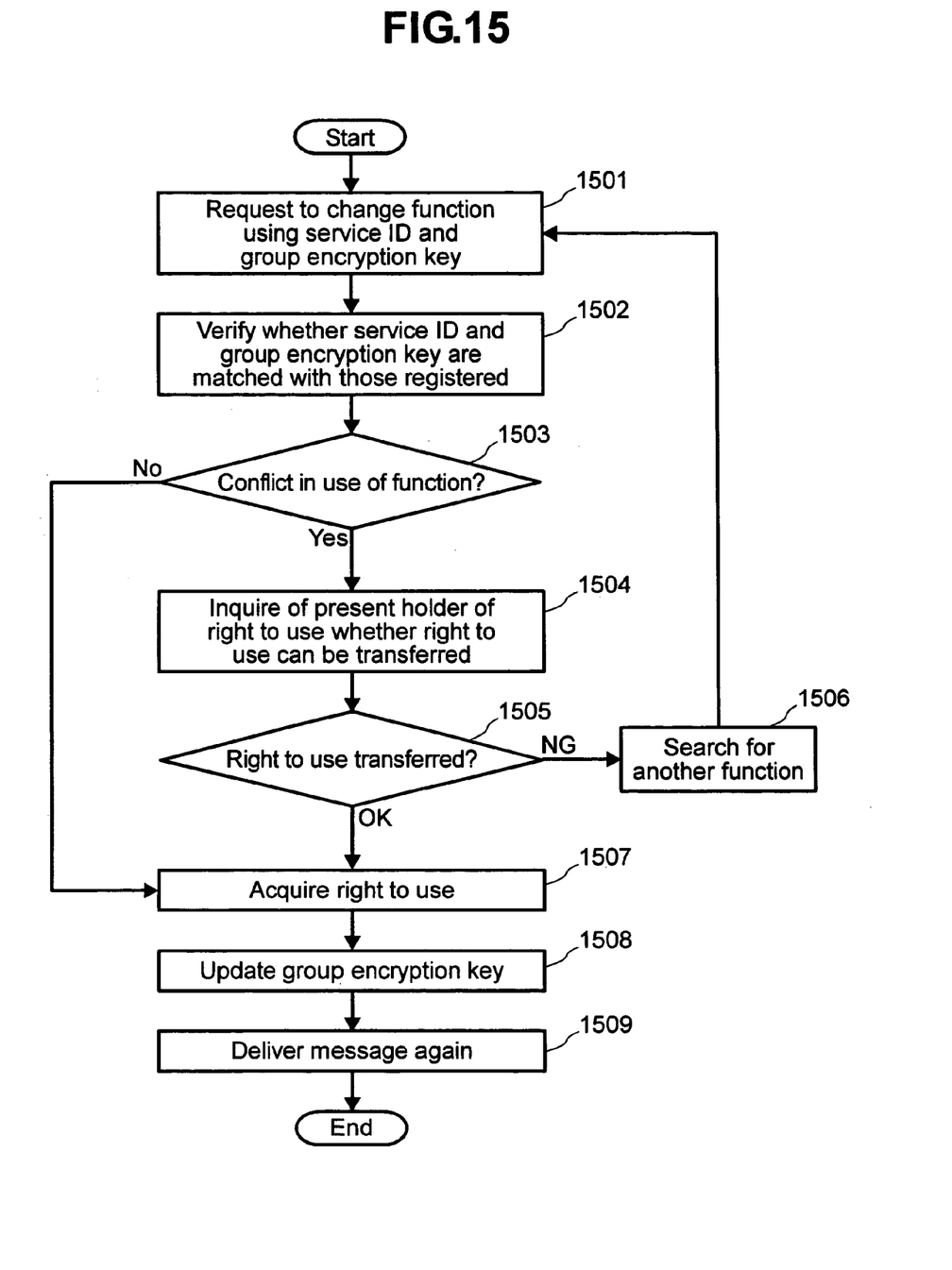

FIG. 15 is a flowchart illustrating the processing steps in transfer negotiation. Transfer negotiation takes place when, as the result of movement or the like, the user is able to connect to more favorable functions in the area and takes over the functions from another user. The process steps are described below.

(1) First, a user who desires to take over a function from another user presents the service ID and the group encryption key to server 101 from the device possessed by the user. Further, the user requests server 101 to change functions (Step 1501).

(2) Service-execution managing function 111 of server 101 verifies whether the group encryption key corresponding to the presented service ID matches the registered group encryption key (Step 1502).

(3) When the group encryption key is successfully verified at Step 1502, it is determined whether the right to use the requested function has been already given to any other user. This decision is made by checking the fields under right to use 804 of the device configuration managing table managed by device-configuration managing function 110 (Step 1503).

(4) If it is determined at Step 1503 that there is conflict, the present holder of the right to use is asked whether the right to use can be transferred. Thus, it is ascertained whether the holder of the right to use will comply with the request to transfer. If not, another function is searched for, and the operation goes back to Step 1501. Then, the same processing steps are repeated (Steps 1504 to 1506).

(5) If the holder of the right to use complies with the request to transfer at Step 1505, the transferred right to use is acquired. If it is found at Step 1503 that there is no conflict, the right to use is immediately acquired (Step 1507).

(6) After the right to use is acquired, the group encryption key is updated (Step 1508), and messages 1109a to 1109c are generated again. The generated messages are delivered to the relevant devices 102a to 102c again (Step 1509).

The above example of processing is characterized in that if any member of the device group for carrying out services is changed, the group encryption key is also updated. Once a device leaves the group, the device cannot interfere with services provided by the group without the intervention of server 101, even though the device is a former member of the group.

Up to this point, the embodiment of the present invention has been described as providing the user with movie delivery service. However, the present invention can be used in other services. For example, when a user in a wheelchair attempts to use an elevator, the user can operate the floor selector buttons with a device, such as a cellular phone, possessed by the user. Another possible service is when a user in a wheelchair attempts to use an escalator, the user calls a helper using a device, such as a cellular phone, possessed by the user. At the same time, the escalator is controlled so that other passengers cannot get on. Thereafter, the escalator is stopped and a treadboard is extended for the wheelchair.

Each processing in the embodiment of the present invention can be created in the form of a processing program. The processing programs can be provided in a recording medium, such as hard disk, digital audio tape, floppy disk, magneto-optic disk, DVD-ROM, and CD-ROM.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A service executing method employing a plurality of devices and a server which manages the devices to permit the plurality of devices to carry out services in coordination with one another, the method comprising:

prompting a user to select a service from a provided service menu;

acquiring a service logic where specifications for implementing the selected service are described;

selecting devices having functions required for carrying out the service based on the service logic according to profile information;

acquiring the right to use said functions, wherein the right to use a function prevents a user from using the function when another user is registered to use that same function;

generating a group encryption key that is common to the devices that carry out the service in coordination with one another and that is used for encrypting data transmitted or received by the plurality of devices when the devices carry out the service in coordination with one another, extracting service components involving configuration information for the necessary functions for carrying out the service from the service logic;

generating adaptors that contain the extracted service components, a service identifier, and the group encryption key; and delivering the generated adaptors to the devices which are to carry out the service; and receiving the adaptors to carry out the service according to information in the adaptors.

2. The method according to claim 1 further comprising authenticating the user when the user makes access and selects functions.

3. The method according to claim 1 wherein with respect to the devices' own embedded functions, the devices manage function types for identifying the functions in common and the attributes of the functions.

4. The method according to claim 3 wherein with respect to the devices under the control of a server, the server manages addresses for accessing the devices, context information on position, right to use, the function types notified from the devices, and the attributes.

5. The method according to claim 1 wherein the server manages service users, service management numbers, the identifiers of presently used functions, the identifiers of functions which can be used in the service, and the group encryption key.

6. The method according to claim 1 wherein the service components contain information on the functions as the targets of setting, programs to be downloaded to the devices having the functions, and the details of connection setting for the application interfaces of the functions and the programs.

7. The method according to claim 1 wherein the devices transmit and receive the data.

8. The method according to claim 1 further comprising:

requesting the server to change the function to be used with the service identifier of the currently used service and the group encryption key for use in the service attached to the request;

verifying whether the service identifier and the group encryption key are matched with those registered;

determining whether there is conflict in use of the function the change to which is requested;

inquiring of the present holder of the right to use about transfer of the right to determine whether the right to use is transferable if there is conflict, searching for another function if the right to use is not transferable and request to change the function again;

acquiring the right to use if transferable; and updating the group encryption key, generating the messages again, and delivering the messages to the devices.

9. A service providing system employing a plurality of devices and a server which manages the devices to permit the plurality of devices to carry out services in coordination with one another, wherein the device used by a user among the plurality of devices has a unit which prompts the user to select a service from a provided service menu and acquires a service logic where specifications for implementing the selected service are described; wherein the server has a unit which selects devices having functions required for carrying out the service based on the service logic according to profile information;

a unit which acquires the right to use said functions, wherein the right to use a function prevents a user from using the function when another user is registered to use that same function;

a unit which generates a group encryption key that is common to the devices that carry out the service in coordination with one another and that is used for encrypting data transmitted or received by the plurality of devices when the devices carry out the service in coordination with one another;

a unit which extracts service components involving configuration information for the necessary functions for carrying out the service from the service logic;

a unit which generates adaptors that contain the extracted service components, a service identifier, and the group encryption key; and a unit which delivers the generated adaptors to the devices which are to carry out the service; and wherein the devices which are to carry out the service comprise a unit which receives the adaptor from the server and carries out the service according to information in the adaptor.

10. A processing program embodied in a computer readable medium for a server in a service providing system employing a plurality of devices, the server managing the plurality of devices to permit two or more of the devices to carry out services in coordination with one another, wherein the program comprises:

a program for selecting devices having functions required for carrying out a service based on a service logic wherein specifications for implementing the service selected by a user from a service menu according to profile information;

a program for acquiring the right to use said functions, wherein the right to use a function prevents a user from using the function when another user is registered to use that same function;

a program for generating a group encryption key that is common to the devices that carry out the service in coordination with one another and that is used for encrypting data transmitted or received by the plurality of devices when the devices carry out the service in coordination with one another;

a program for extracting service components involving configuration information for the necessary functions for carrying out the service from the service logic;

a program for generating adaptors that contain the extracted service components, a service identifier, and the group encryption key; and a program for delivering the generated adaptors to the devices which are to carry out the service.

11. The method according to claim 1, wherein the selecting step further comprises selecting devices within an authority of the user after the user has been authenticated to the server.

12. The method according to claim 1, wherein the service logic includes a graphic representation of a relation between functional units and programs, and the functional units include conditions of function types to be found and selection conditions for selecting relevant functions.

13. The method according to claim 1, wherein the service component includes a function as the target of setting, a downloaded function as the program to be downloaded, and a functional relation as information on the configuration of coordination between functions.

14. The method according to claim 1, wherein the server updates the group encryption key corresponding to an updated group of devices for carrying out the service if the group of the devices is updated.

* * * * *